US012709206B2

(12) United States Patent
Zwick et al.

(10) Patent No.: US 12,709,206 B2
(45) Date of Patent: Aug. 18, 2026

(54) SEAT ELEMENT

(71) Applicants: Roland Zwick, Berlin (DE); Carola Zwick, Berlin (DE); Burkhard Schmitz, Berlin (DE)

(72) Inventors: Roland Zwick, Berlin (DE); Carola Zwick, Berlin (DE); Burkhard Schmitz, Berlin (DE)

( * ) Notice: Subject to any disclaimer, the term of this patent is extended or adjusted under 35 U.S.C. 154(b) by 185 days.

(21) Appl. No.: 18/691,332

(22) PCT Filed: Sep. 16, 2022

(86) PCT No.: PCT/EP2022/075788
§ 371 (c)(1),
(2) Date: Mar. 12, 2024

(87) PCT Pub. No.: WO2023/046591
PCT Pub. Date: Mar. 30, 2023

(65) Prior Publication Data

US 2024/0270136 A1 Aug. 15, 2024

(30) Foreign Application Priority Data

Sep. 21, 2021 (DE) ......................... 102021124452.8
Nov. 11, 2021 (DE) ......................... 102021129419.3

(51) Int. Cl.
*B60N 2/70* (2006.01)
*B60N 2/64* (2006.01)
*B60N 2/68* (2006.01)

(52) U.S. Cl.
CPC .............. *B60N 2/7011* (2013.01); *B60N 2/64* (2013.01); *B60N 2/68* (2013.01)

(58) Field of Classification Search
CPC ........ B60N 2/7011; B60N 2/64; B60N 2/667; B60N 2/6671; B60N 2/6673
See application file for complete search history.

(56) References Cited

U.S. PATENT DOCUMENTS

2010/0117430 A1* 5/2010 Moeseneder .......... B64D 11/06
297/452.56

FOREIGN PATENT DOCUMENTS

DE 69334123 T2 11/2007
DE 102017130113 A1 * 6/2019 ............... B60N 2/06
(Continued)

OTHER PUBLICATIONS

International Preliminary Report on Patentability for International Application No. PCT/EP2022/075788, dated Apr. 4, 2024, 13 Pages.
(Continued)

*Primary Examiner* — Magdalena Topolski
*Assistant Examiner* — Shanna Danielle Glover
(74) *Attorney, Agent, or Firm* — Christopher J. Volkmann; KELLY, HOLT & CHRISTENSON PLLC

(57) ABSTRACT

A seat element includes a carrier frame and supporting surfaces. The carrier frame includes at least one left-hand side member and a right-hand side member. The supporting surfaces are designed in the form of a seat surface and backrest surface. At least one of the supporting surfaces includes a covering element. The covering element includes a fabric and is stretch-mounted, on the left-hand side member and on the right-hand side member of the carrying frame. The covering element includes tension elements. The tension elements are subjected to pulling action by means of in each case at least one of the actuators in such a manner that a level of tensioning to which the fabric of the covering element is subjected when the actuator has been activated is greater than a level of tensioning to which the fabric of the covering element is subjected when the actuator has been deactivated.

18 Claims, 10 Drawing Sheets

(56) References Cited

FOREIGN PATENT DOCUMENTS

| | | | | | |
|---|---|---|---|---|---|
| DE | 102019220141 | A1 | * | 6/2021 | ........... B60N 2/7011 |
| GB | 2569289 | A | * | 6/2019 | ............... A47C 7/22 |
| HU | 213695 | B | * | 9/1997 | ............. B60N 2/666 |
| WO | 2007031216 | A1 | | 3/2007 | |

OTHER PUBLICATIONS

Search Report and Written Opinion for PCT Application No. PCT/EP2022/075788, dated Sep. 16, 2022, 16 pages included English translation.

* cited by examiner

S5
102
105
104
109
108
159
158

105
107
108
103b
101b
T5
104
α1
α2
AT104
S5
102
172
AT105
B5-3
B5
E2-104
E1-104
L104

SEAT ELEMENT

CROSS-REFERENCES TO RELATED APPLICATIONS

This Application is a Section 371 National Stage Application of International Application No. PCT/EP2022/075788, filed Sep. 16, 2022, and published as WO 2023/046591 A1 on Mar. 30, 2023, and claims priority to German Application No. 102021124452.8, filed Sep. 21, 2021, and to German Application No. 102021129419.3, filed Nov. 11, 2021. The contents of these applications are hereby incorporated by reference in their entirety.

DETAILED DESCRIPTION

Figure 1A:
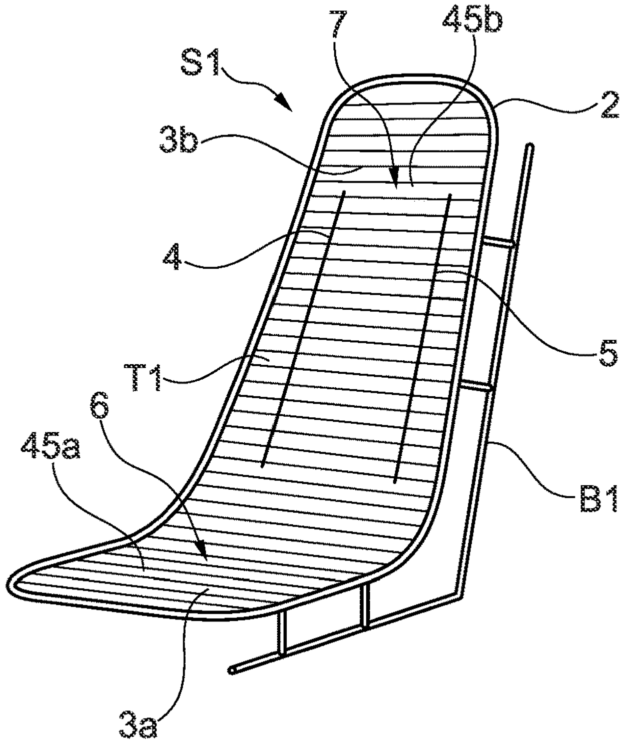
FIG. 1*a* shows a perspective view of a first variant of a seat element having a carrier frame and two supporting surfaces, which are designed in the form of a single-part carrying surface and are in a non-deformed state in which they have been relieved of tension.

The present disclosure relates to a seat element according to the preamble of claim 1.

DE 693 34 123 T2 discloses a seat element which comprises a carrier frame and supporting surfaces, wherein the carrier frame comprises a left-hand side member and a right-hand side member, wherein at least one of the supporting surfaces comprises a covering element and wherein the covering element comprises a fabric and is supported on the left-hand side member and on the right-hand side member of the carrier frame.

In particular in the field of motor-vehicle seats, e.g. in the case of sports seats for sports cars or where high-level comfort-related requirements have to be met, both adaptability to the user's requirements and individual adjustment of force-absorbing pressure zones, e.g.—in the case of sports cars—for providing the driver with the necessary support, are matters for ongoing development.

The present disclosure is based on the object of developing a seat element of which the covering element is individually adaptable to the user and/or the use requirements.

Proceeding from the features of the preamble of claim 1, this object is achieved by the characterizing features of claim 1. Advantageous and expedient developments are specified in the dependent claims.

The present disclosure relates to a seat element comprising a carrier frame and supporting surfaces, wherein the carrier frame comprises at least one left-hand side member and a right-hand side member, wherein the supporting surfaces are designed in particular in the form of a seat surface and/or backrest surface, wherein at least one of the supporting surfaces comprises a covering element, wherein the covering element comprises a fabric and is supported, in particular stretch-mounted, on the left-hand side member and on the right-hand side member of the carrier frame.

The seat element is thereby designed in the form of a fabric seat element.

An example of the present disclosure is characterized in that the seat element comprises at least one actuator, preferably a plurality of actuators, and in that the covering element comprises tension elements, wherein the tension elements are subjected to pulling action by means of in each case at least one of the actuators in such a manner that a level of tensioning to which the fabric of the covering element is subjected when the actuator has been activated is greater than a level of tensioning to which the fabric of the covering element is subjected when the actuator has been deactivated.

Provision is therefore made so that actuation by actuators makes it possible to alter the fabric of the covering element in terms of its tensioning and therefore its mechanical and/or geometrical properties. In order that the fabric is not subjected directly to the action of the tensile forces, however, tension elements are provided for the purpose of transmitting the tensile forces from the actuators.

It is also conceivable to have a plurality of actuators acting on one tension element and to have a plurality of tension elements for one actuator.

Haptic adaptation within the context of the present disclosure is understood to mean, inter alia, mechanical adaptation in terms of the hardness, the contouring and the resilience of the seat element. Visual adaptation within the context of the present disclosure is understood to mean the visible geometry of the seat element, but also the contouring and any surface curvature as well as other visible structural properties of the seat element.

In a development, provision is made for the fabric of the covering element to comprise at least one weft thread and warp threads, wherein the warp threads preferably run in the direction of the left-hand side member and of the right-hand side member and wherein the at least one weft thread runs in a central region of the covering element in a direction transverse to the warp threads.

Forming the fabric by way of a material produced by a weaving process using warp threads and weft threads gives a cost-optimized configuration and makes it possible to provide predefined geometries, e.g. when the seat is configured using the fabric material. Stability and haptic properties are also adjustable due to it being possible for use to be made of threads of different thicknesses and different materials.

A further embodiment makes provision for the fabric of the covering element to be designed in the form of a looped-stitch structure, in particular made of yarns, by loops of thread being interlaced, wherein the looped stitches in a row are formed one after another, in particular in the form of knitted looped stitches, preferably by a 3D-knitting process.

3D-knitting processes, which are becoming increasingly important in the technology, make it possible for structures in respect of pattern and shape, but also in respect of three-dimensional geometries, e.g. pockets or mounts, to be introduced directly without additional elements having to be subsequently sewn, or fastened in some other way, on a covering element.

Moreover, provision is made in one embodiment so that, in particular in the region of the fabric, the covering element comprises different fabric densities, in particular looped-stitch sizes or thread spacings.

Different fabric densities make it possible to define force paths and geometrical structures such as angling, which is advantageous for configuring seat geometries, in particular in respect of a motor-vehicle seat, for the purpose of forming a seat hollow or to provide user-adapted support of the body.

These different fabric densities also make it possible to adapt the stability of the fabric, for example so that it is possible to form appropriate add-on elements or mounts in the region of the tension elements.

Provision is also made for the tension elements to be connected to the covering element in such a manner that each of the tension elements is retained in a non-displaceable manner on the covering element. This makes it possible, by virtue of the tension element being moved by means of the at least one actuator, predictably for the tension element to act on a level of tensioning and shaping of the carrying surface of the seat element and to bring about a predefined increase in the tensioning and shaping.

A further embodiment makes provision for at least one of the tension elements to be arranged on a front surface of the covering element and for the at least one actuator to act on a rear surface of the covering element, the rear surface being located opposite the front surface, in order to subject the tension element to pulling action, wherein the at least one actuator and the respective tension element are connected to one another through the covering element, wherein provision is made in particular for the tension element to comprise at least one fastening point and for the fastening point to engage through the covering element.

A tension element, for example in the form of a thin plastic or metal rod or bar or other kinds of structure on the front side, can influence the surface geometry of the covering element in the manner of a linkage, depending on how strongly the tensile force to which the tension element is subjected by the actuator is transmitted into the surface. It is possible here to provide a plurality of fastening points, in order to ensure an as far as possible continuous progression of the contour lines of the supporting surfaces of the seat element. It is also conceivable to have a plurality of actuators acting on one tension element and to have a plurality of tension elements for one actuator.

A further embodiment makes provision for at least one of the tension elements to be arranged on a front surface of the covering element, in particular to be incorporated in a mount, preferably a pocket, formed on the front surface, and for the at least one actuator to act on a rear surface of the covering element, the rear surface being located opposite the front surface, in order to subject the tension element to pulling action, wherein the at least one actuator and the respective tension element are connected to one another through the covering element, wherein provision is made in particular for the tension element to comprise at least one fastening point and for the fastening point to engage through the covering element.

It can be advantageous for some of, or all, the tension elements to be incorporated in mounts on the covering element, so that, on the one hand, the appearance of the seat element can be freely adapted and, on the other hand, the tension elements can also be covered over or encapsulated.

This has the advantage that a person using the seat element cannot get caught on the tension element and the tension element is not seen. Moreover, a mount, in particular an appropriate pocket, gives rise to an improved transmission of forces from the tension element into the fabric, since clear lines can be realized more easily, and the arrangement on the covering element is clearly defined.

A further variant makes provision for the tension element to be introduced within the covering element, in particular to be incorporated in the structure of the covering element, preferably by being woven therein and/or knitted therein, and for the actuator to act on the tension element in order to subject the tension element to pulling action, wherein the actuator and the tension element are connected to one another through the covering element, wherein provision is made in particular for the tension element to comprise at least one fastening point and for the fastening point to engage through the covering element or to pass out of the same.

Proceeding from the above-described arrangements of the tension element, it is also possible for the latter to be introduced integrally within the covering element. This allows the tension element advantageously to be formed on the inside without haptic or visual properties of the seat element being significantly affected by the tension element.

It is also conceivable for tension elements of different levels of rigidity to be formed in variable lengths and geometries, and these can be selected in dependence on the desired contouring of the supporting surface and/or of the covering element.

A further embodiment makes provision so that, on a rear surface, which is located opposite a front surface of the covering element, at least one mount is formed on the covering element, in particular at least one pocket is formed on the covering element, and at least one tension element is incorporated in the mount or is fastened on the mount, wherein the actuator acts on the tension element in order to subject the tension element to pulling action and wherein provision is made in particular for the actuator and the tension element to be connected to one another through the covering element.

It is also the case that the formation of mounts, in particular pockets, for the tension element on the rear side of the covering element provides a solution—depending on the desired geometry and application of forces—for obtaining the level of fabric tensioning which is to be achieved and for performing adaptation of haptic and visual properties.

The above-described embodiments of the arrangement of the tension element relative to the surface of the covering element and/or of the fabric on a front side, in pockets, integrally or on a rear side, in pockets etc., should not themselves be regarded as an exhaustive list; rather—depending on the application case and the effect of the respective tension element on the covering element and the supporting surface—they can also be used in combination or interchangeably.

A further configuration of the seat element makes provision for the actuator to comprise a tensioning body, wherein the covering element is connected to the tensioning body via the tension element either directly or indirectly with the interposition of a force-transmission element designed, in particular, in the form of a tensioning slide and/or deflecting element and/or hydraulic element and/or pneumatic element.

In this way, the arrangement of the actuator can be freely selected and it is also possible for the mechanical effect of the actuator to be adapted to the necessary tensile force and the required pulling distance. In this way, the respective actuator can interact appropriately with the respective tension element or the tension elements so as to adjust the seat element in accordance with requirements.

A further exemplary embodiment makes provision, moreover, for deformation of the supporting surface to take place by the covering element being tensioned by virtue of the tension element being subjected to a pulling force by the actuator, the pulling force running in the direction of a plane defined on a by the covering element.

In accordance with the desired alteration in the tensioning of the covering element, the tensile force directed away from the plane, for example at an angle of between +/−45° in relation to the vertical pulling direction to which the respective tension element is subjected, makes it possible for the curvature, possibly even the overall curvature, of the covering element to be adjusted. In this way, it is possible, e.g. in the case of motor-vehicle seats, for the seat hollow to be adapted particularly effectively to the user and for lateral support to be improved.

In a further variant, provision is made for a plurality of zones to be formed by a plurality of tension elements and/or a plurality of covering elements and/or for the plurality of tension elements to be arranged in different ways on the covering element(s), or to be incorporated thereon according to one of the preceding claims.

The combination of the plurality of tension elements, the formation of zones and different fitting methods makes it possible to meet the required degree of complexity, e.g. in the case of motor-vehicle seats, so that the best possible degree of adaptability is provided for each individual case.

Provision is also made to equip the seat element with a base, wherein the carrier frame is connected to the base and wherein each of the actuators is connected by way of a first end to one of the tension elements and each of the actuators is connected by way of a second end to the base or the carrier frame. In this way, the actuators can subject the tension elements to the desired tensile forces. Provision is also made here for the carrier frame to be connected to the base in an adjustable manner and to be displaceable or pivotable between at least two positions in which it is fixed firmly on the base. This allows the seat element to be adapted straightforwardly to different user requirements.

Provision is further made for at least one of the tension elements of the supporting surface to be connected to the base by at least one of the actuators in such a manner that, by way of its longitudinal axis, each of the actuators encloses an angle of at least 30° and preferably at least 45°, and quite particularly preferably at least 60°, in all directions in space in relation to the supporting surface, which is adjacent to the tension element—the supporting surface preferably being in the state in which it has been relieved of tension. It is thereby possible, by straightforward means, to subject the supporting surface to shaping and tensioning action.

Provision is also made for at least two of the tension elements of the backrest surface to be connected to the base by in each case at least two actuators in such a manner that, by way of their respective longitudinal axis, the actuators enclose an angle of at least 30° and preferably at least 45° in all directions in space in relation to the adjacent backrest surface—the backrest surface preferably being in the state in which it has been relieved of tension, wherein provision is made in particular for the actuators assigned to each tension element to be connected to the tension element at mutually remote connecting locations and to be connected to the base at other mutually remote connecting locations. It is thereby possible, by straightforward means, to subject the backrest surface to shaping and tensioning action and to hold the tension elements in position in a particularly reliable manner.

Provision is further made for at least two tension elements of the seat surface to be connected to the base by in each case at least two actuators in such a manner that, by way of their respective longitudinal axis, the actuators enclose an angle of at least 20° and preferably at least 30° in all directions in space in relation to the adjacent seat surface—the seat surface preferably being in the state in which it has been relieved of tension, wherein provision is made in particular for the actuators assigned to each tension element to be connected to the tension element at mutually remote connecting locations and to be connected to the base at other mutually remote connecting locations. It is thereby possible, by straightforward means, to subject the seat surface to shaping and tensioning action and to hold the tension elements in position in a particularly reliable manner.

Provision is also made for at least two tension elements, which extend over the backrest surface and the seat surface, to be connected to the base by in each case at least one actuator in such a manner that, by way of their respective longitudinal axis, the actuators enclose an angle of at least 30° and preferably at least 45° in all directions in space in relation to the adjacent supporting surfaces—the supporting surfaces preferably being in the state in which they have been relieved of tension, wherein, if the tension element is assigned at least two actuators, provision is made in particular for the actuators assigned to each tension element to be connected to the tension element at mutually remote connecting locations and to be connected to the base at other mutually remote connecting locations. It is thereby possible, by straightforward means, to subject the backrest surface and the seat surface to shaping and tensioning action and to hold the tension elements in position in a particularly reliable manner.

Provision is further made for at least one arcuate tension element to be arranged in a transition region of the supporting surfaces, the latter merging, in the form of a carrying surface, from the backrest surface into the seat surface in this transition region, wherein the arcuate tension element is connected to the base by at least one actuator in such a manner that the arcuate tension element is braced away in the rearward direction from a front edge of the seat surface and is braced away in the downward direction from a the upper edge of the backrest surface. It is thereby possible, by straightforward means, to form the covering element into a seat surface and a backrest surface.

Provision is also made for the tensile force of at least one of the actuators to be adjusted either manually or by motor, wherein provision is made in particular for a plurality of actuators to be jointly adjustable. On the one hand, it is thereby possible to adapt tensioning and shaping to the individual requirements of a user. On the other hand, it is possible to compensate for an alteration in tensioning and/or shaping that is brought about by a change in the ambient temperature, so that, irrespective of even large fluctuations in the ambient temperature, the seat element has a consistent level of seat comfort. In the case of adjustment by motor, it is also possible, in particular, for an active seat element to be realized.

Provision is further made for the tension element to be designed in the form of a rectilinear structure or in the form of a curved structure or in the form of a Y-type structure or in the form of an annular structure or in the form of a polygonal structure, wherein the structure is designed so as to be either elastically deformable or rigid or partially rigid and partially elastic, in particular in end regions. This makes it possible to influence the tensioning and shaping to an increased extent, so that the seat comfort can be further increased.

Provision is also made for the tension element to be connected to the actuator or the actuators exclusively in a central region. End regions of the tension element are thereby free of actuators acting directly thereon, so that the situation where the covering is affected to an undesirably pronounced extent is avoided.

Finally, provision is made to equip the carrier frame with at least one upper bracket, which connects the left-hand side member and the right-hand side member behind the backrest surface and runs at a distance from the backrest surface, and/or to equip the carrier frame with at least one lower bracket, which connects the left-hand side member and the right-hand side member beneath the seat surface and runs at a distance from the seat surface, and/or to equip the carrier frame with at least one central bracket, which connects the left-hand side member and the right-hand side member in a transition region, the seat surface and the backrest surface merging into one another in this region, and which runs at a distance from the seat surface and at a distance from the backrest surface. This makes possible a compact seat construction which, despite wide-ranging functionality, requires little installation space.

The present disclosure will be explained further on a schematic basis with reference to the following exemplary embodiment. However, the present disclosure here is not restricted to the variant illustrated.

All the figures are confined to schematic illustrations and serve to explain the core concept of the present disclosure. In the respective figures a) and b), like elements are denoted by like reference signs. Comparable components from different variants are in some cases denoted by the same reference signs.

Figure 1B:
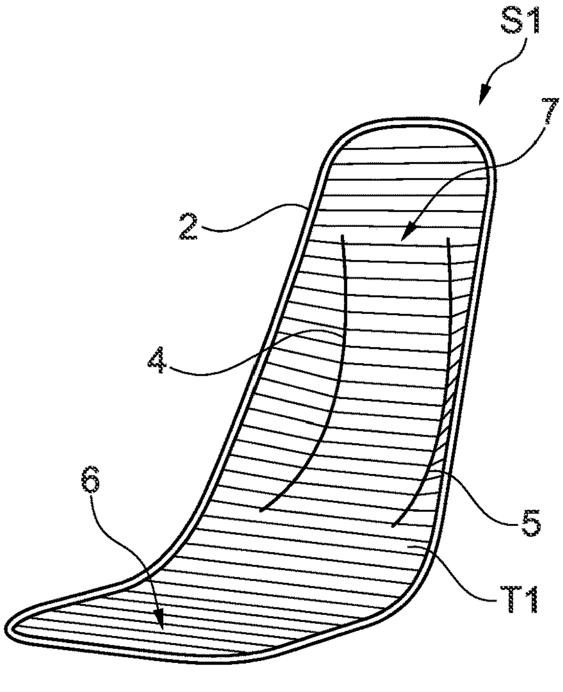
FIG. 1*b* shows a further perspective view of the first variant of the seat element, wherein the supporting surfaces, which are designed in the form of a single-part carrying surface, are in a tensioned and deformed state.

FIGS. 1*a* and 1*b* show a schematic view of a first variant of a seat element S1 having a carrier frame 2 and supporting surfaces 1*a*, 1*b* retained thereby. A base B1 of the seat element S1, the base supporting the carrier frame 2, is illustrated only in simplified form and only in FIG. 1*a*. The supporting surfaces 1*a*, 1*b* are designed in the form of a seat surface 6 and a backrest surface 7, which each comprise a covering element 45*a*, 45*b*. The covering elements here 45*a*, 45*b* each comprise a fabric 3*a*, 3*b* and together form a single-part carrying surface T1, so that the fabric 3*a* of the seat surface 6 merges seamlessly into the fabric 3*b* of the backrest surface 7 and forms the carrying surface T therewith. For the carrying surface T1, only schematically indicated transverse threads—also referred to as weft threads—are marked here, in order to facilitate differentiation from line-marked tension elements 4, 5. The fabric 3*b* of the backrest surface 7 here performs the function of the covering element 45*b*. The two tension elements 4, 5 here are arranged on the covering element 45*b*. The supporting surfaces 1*a*, 1*b* here are designed in the form of those of a motor-vehicle seat and form the seat surface 6 and also the backrest surface 7. The tension elements 4, 5 are formed along the backrest surface 7.

FIG. 1*a* shows the supporting surface 1*b* with the fabric 3*b* fixed in place in the carrier frame 2 without the tension elements 4, 5 being subjected to any additional tensile load. FIG. 1*b* shows the supporting surface 1*b* with the tension elements 4, 5 being subjected to additional tensile load. The backrest surface 7 here is curved in its central region and follows the curvature of the tension elements 4, 5 to form an ergonomic backrest shell. The respective actuators which bring about the curvature by subjecting the tension elements 4, 5 to pulling action are not illustrated here.

It is the case for all variants that the seat surface and the backrest surface form a carrying surface. The latter comprises the fabric which forms the seat surface and the fabric which forms the backrest surface. This is designed either in a single part, when the fabrics which form the seat surface and the backrest surface are in a connected state, or in two parts, when the fabrics which form the seat surface and the backrest surface are in a non-connected state. Within the context of the present disclosure, the term backrest surface is understood to equate to the term backrest element and the term seat surface is understood to equate to the term seat element.

Figure 2A:
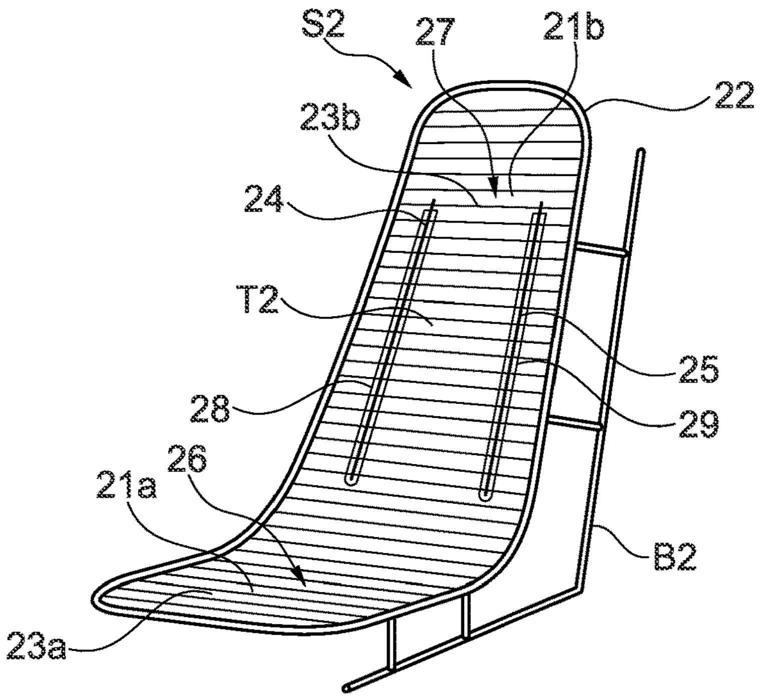
FIG. 2*a* shows a perspective view of a second variant of a seat element having a carrier frame and two supporting surfaces, which are designed in the form of a single-part carrying surface and are in a non-deformed state in which they have been relieved of tension.
Figure 2B:
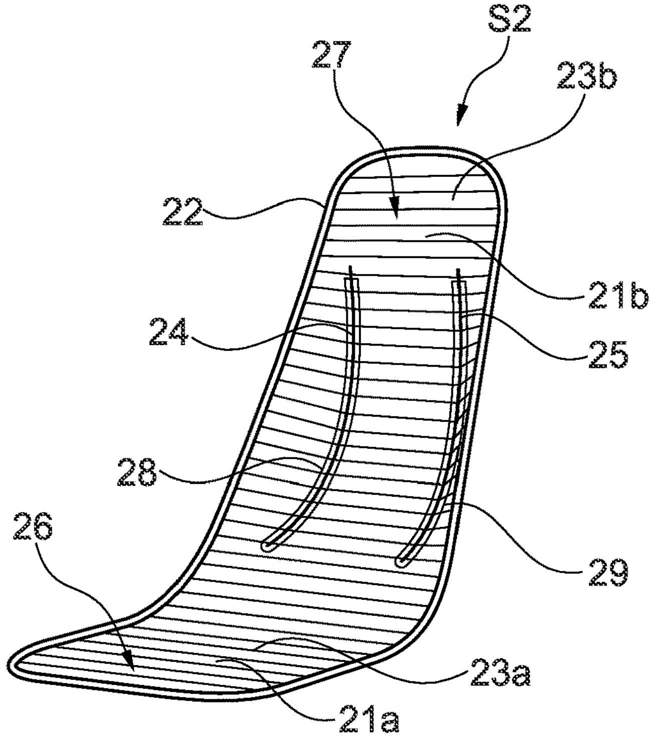
FIG. 2*b* shows a further perspective view of the second variant of the seat element, wherein the supporting surfaces, which are designed in the form of a single-part carrying surface, are in a tensioned and deformed state.

FIGS. 2*a* and 2*b* show a corresponding embodiment of seat surface 21*a*, 21*b* of a second seat element S2 having a carrier frame 22 and fabric 23*a*, 23*b*. As in the first variant, the fabrics 23*a*, 23*b* form a carrying surface T2. In the case of the second embodiment, tension elements 24, 25 are guided in pockets 28, 29. The seat surface 26 is designed without tension elements. As illustrated in FIG. 2*b*, the backrest surface 27 is curved by the tension elements 24, 25 being subjected to pulling action—as described above in relation to the first variant—and, correspondingly, it also forms, in the embodiment according to FIG. 2*b*, a backrest shell. The seat element S2 also comprises a base B2, which is illustrated in simplified form only in FIG. 2*a* and supports the carrier frame 22. If the actuators (not illustrated) have been activated—as is shown in FIG. 2*b*—they pull the tension elements toward the base B2, so that the backrest surface 27 is shaped to give the ergonomic backrest shell.

Figure 3A:
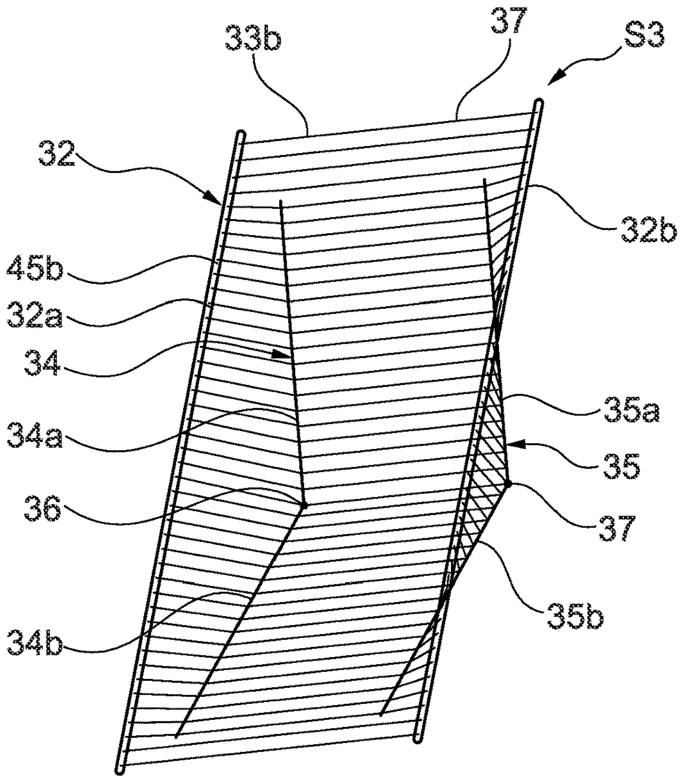
FIG. 3*a* shows a perspective view from the rear of a third variant of a seat element having a carrier frame and two supporting surfaces, which are designed in the form of a single-part carrying surface and are in a non-deformed state in which they have been relieved of tension.
Figure 3B:
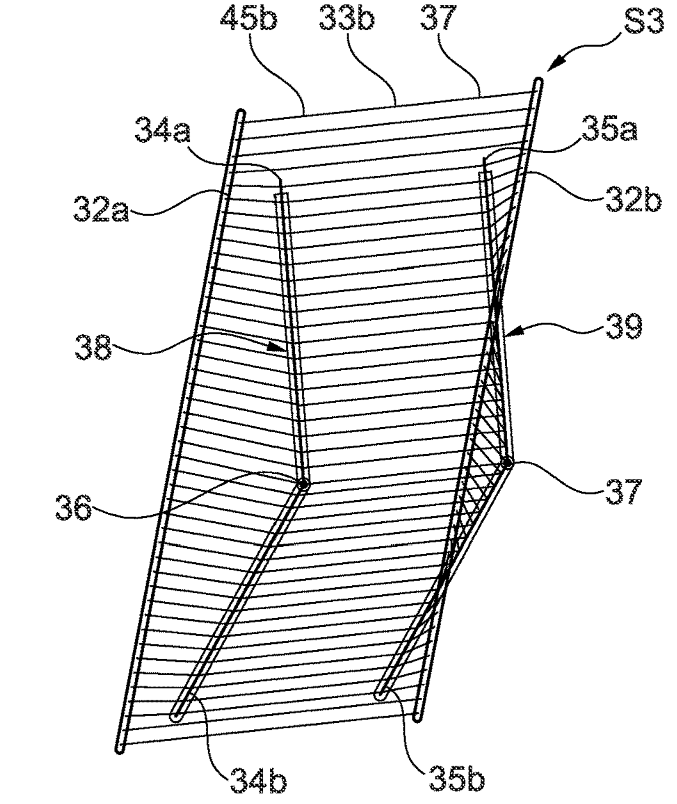
FIG. 3*b* shows a further perspective view of the third variant of the seat element, wherein the supporting surfaces, which are designed in the form of a single-part carrying surface, are in a tensioned and deformed state.

FIGS. 3*a* and 3*b* show two variations, in detail form, of a third variant of a seat element S3 by way of a view from the rear of a backrest surface 37 which comprises a covering element 45*b* made of fabric 33*b*. The backrest surface 37 is fixed in place between a right-hand (as seen from the front) side member 32*a* and a left-hand side member 32*b* of a carrier frame 32. A respective tension element 34, 35 is indicated on the left-hand side and on the right-hand side, these tension elements being designed in the form of two linear portions 34*a*, 34*b* and 35*a*, 35*b* with points of engagement a34, a35 arranged therebetween for actuators (not illustrated).

In contrast to FIG. 3*a*, in which the tension elements 34, 35 act directly on the fabric 33*a*, or are illustrated as being placed thereon, FIG. 3*b* has, for each tension element 34, 35, a receiving element in the form of a pocket 38, 39, in which the tension element 34, 35 is respectively arranged. Each pocket 38, 39 is formed integrally with the fabric 33*a* or can be incorporated, e.g. by a 3D-knitting process, during production of the fabric. In order to maintain clarity, the illustration of a base and the illustration of a seat surface have been dispensed with in FIGS. 3*a* und 3*b*.

Figure 4:
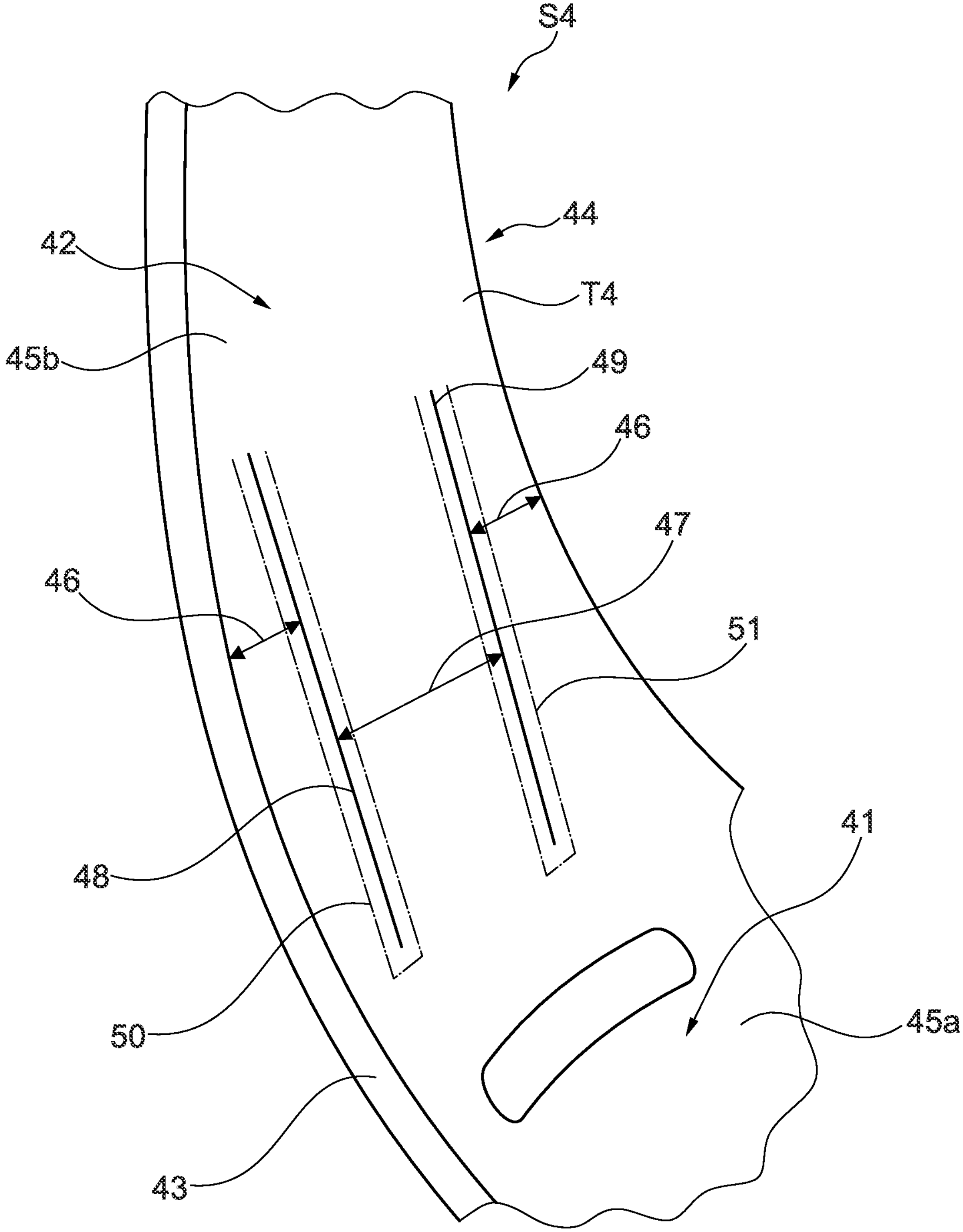
FIG. 4 shows a perspective view of a fourth variant of a seat element.

FIG. 4 shows an illustration of a fourth variant of a seat element S4, having a seat surface 41 and a backrest surface 42. The seat element S4 comprises—as seen from the front—a left-hand side member 43 and a right-hand side member 44 (covered over in the illustration). Covering elements 45*a*, 45*b* are introduced between the side members 43, 44 to form a single-part carrying surface T4, the covering elements comprising a relatively dense fabric zone 46 at the periphery and a netting-like fabric zone 47 in the center. Tension elements 48, 49 are introduced in the vertical direction, approximately parallel to one another, in the peripheral region of the fabric zone 47 and are arranged integrally within pockets 50, 51. On a concealed rear side of the covering element 45*b*, the tension elements 48, 49 in the pockets 50, 51 can be pulled into the image plane by actuators (not illustrated) in order to provide for deformation of the fabric zone 47, and therefore of the backrest surface 42, and in order to increase the tensioning in the covering element 45*b*. This makes it possible for the seat element S4 to be adapted in terms of geometry and haptic properties as well as mechanical properties.

FIGS. 5*a* to 5*j* show different views of a fifth variant of a seat element S5.

The seat element S5 comprises a carrier frame 102, supporting surfaces 101*a*, 101*b* and a base B5. The base B5, which supports the carrier frame 102, comprises three brackets B5-1, B5-2 and B5-3 formed. The carrier frame 102 comprises a left-hand side member 102*b* and a right-hand side member 102*a* as well as an upper crossmember 102*c* and a front crossmember 102*d*. These form the surrounding carrier frame 102. The supporting surfaces 101*a*, 101*b* are designed in the form of a seat surface 106 and a backrest surface 107, wherein the two supporting surfaces 101*a*, 101*b* each comprise a covering element 145*a*, 145*b* and wherein each of the covering elements 145*a*, 145*b* comprises a fabric 103*a*, 103*b* and is supported on the left-hand side member 102*b* and on the right-hand side member 102*a* of the carrier frame 102. The covering element 145*b* here is additionally supported on the upper crossmember 102*c*. The covering element 145*a* here is additionally supported on the front crossmember 102*d*. Furthermore, the covering elements 145*a* and 145*b* are connected to one another or merge seamlessly into one another.

Figure 5A:
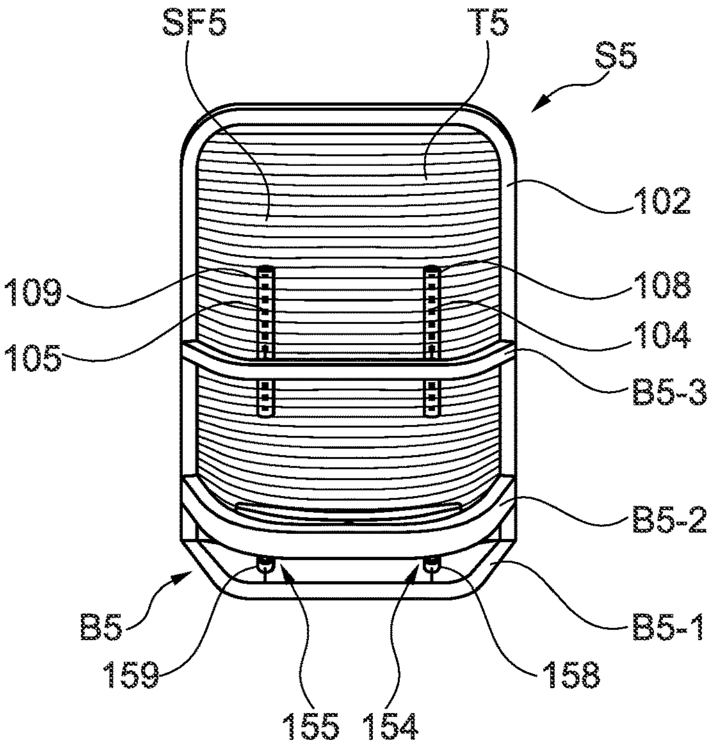
FIGS. 5*a*-5*j* show different views of a fifth variant of a seat element.
Figure 5B:
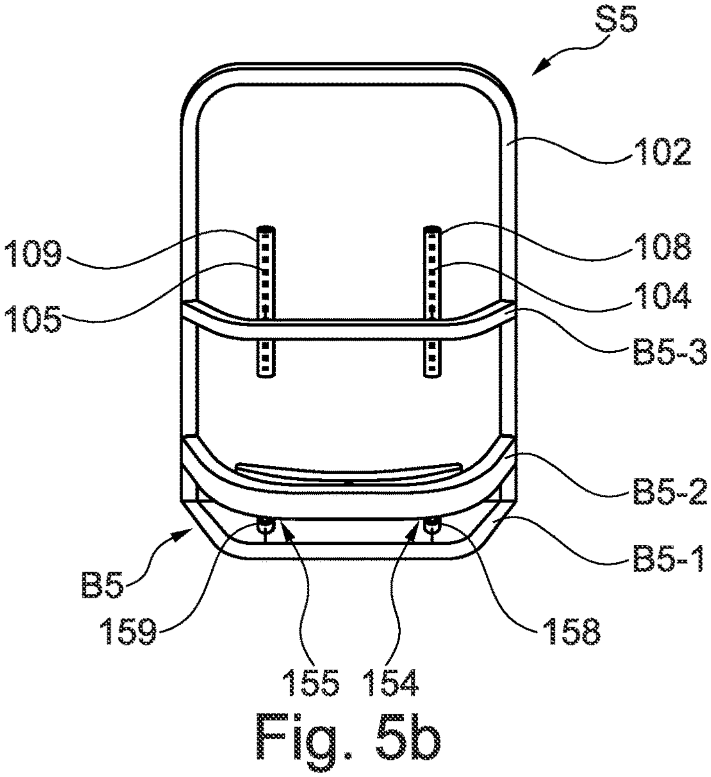
Figure 5C:
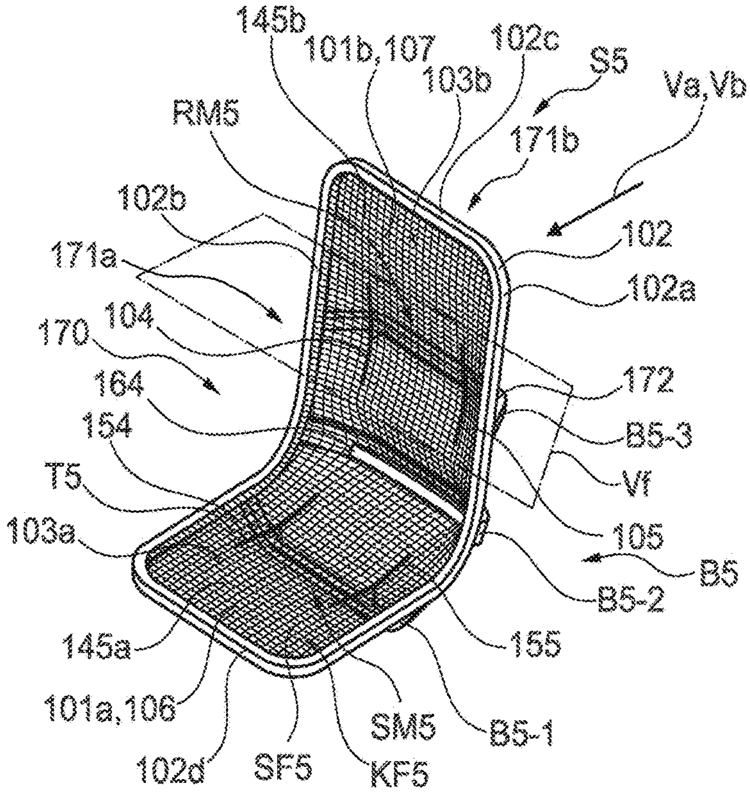

FIG. 5*c* shows the seat element S5 entirely in a perspective view, wherein a single-part carrying surface T5, which is formed by the seat surface 106 and the backrest surface 107, is indicated by weft threads SF5 and warp threads KF5. Through these, it is possible to see the brackets B5-1, B5-2 and B5-3 and also tension elements 104, 105, which are located behind the backrest surface 107, and tension elements 154, 155, which are located beneath the seat surface 106. The tension elements 104, 105, 154, 155 here are each incorporated in respective pockets 108, 109 and 158, 159, formed respectively on the backrest surface 107 and on the seat surface 106, and they are thereby fixed on the carrying surface T5. As far as the pockets are concerned, reference is made in particular to FIGS. 5*a*, 5*b* and 5*e*. In order to maintain clarity of the figure, the pockets are not illustrated in FIG. 5*c*.

Figure 5D:
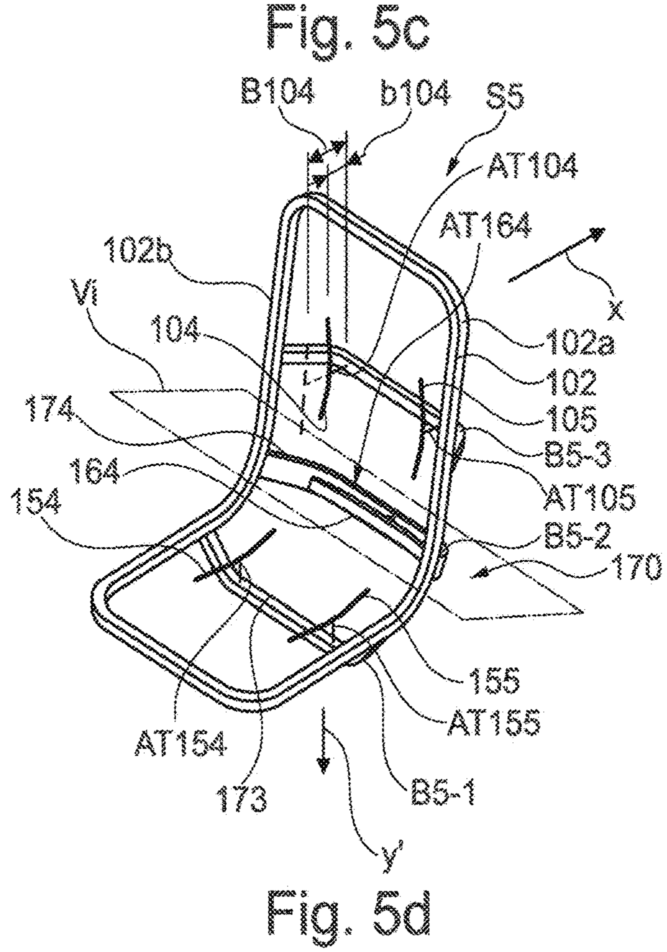

To aid understanding, FIG. 5*d* shows the seat element S5 without the carrying surface T5. It can be seen from this illustration that the tension element 104 is connected by an actuator AT104, and the tension element 105 is connected by an actuator AT105, to the bracket B5-3, which is located behind the backrest surface, which has been blanked out in FIG. 5*d*, and that the tension element 154 is connected by an actuator AT154, and the tension element 155 is connected by an actuator AT155, to the bracket B5-1, which is located beneath the seat surface, which has been blanked out in FIG. 5*d*.

A fifth tension element 164 (see in particular FIGS. 5*c* and 5*d*) runs, in a direction transverse to the orientation of the side members 102*a*, 102*b*, in a transition region 170 of the carrying surface T5, the seat surface 106 merging into the backrest surface 107 in this transition region. In contrast to the tension elements 104, 105, 154, 155, which are arranged in the pockets 108, 109, 158, 159 on an underside 171*b* of the carrying surface T5, the tension element 164 is not incorporated in a pocket; rather, it is placed on an upper side 171*a* of the carrying surface T5 (see in particular FIG. 5*c*). The upper side 171*a* here is also referred to as front surface 171*a*. The tension element 164 is connected to the central bracket B5-2 via a further actuator AT164 (see in particular FIG. 5*d*) through the carrying surface T5. The actuator AT164 here is connected to the tension element 164 in a central region M164, which is located in the center of this tension element.

In FIG. 5*d*, all the tension elements 104, 105, 154, 155, 164 are in a position in which they have been tensioned by the actuators AT104, AT105, AT154, AT155, AT164, this position being assumed thereby when the carrying surface T5 has been tensioned and deformed, as is shown in FIG. 5*c*. In this tensioned position, the carrying surface T5 forms a seat hollow SM5 in the region of the seat surface 106, and a backrest hollow RM5 in the region of the backrest surface 107, and is angled slightly in the transition region 170 of the carrying surface T.

FIG. 5*d* uses dashed lines at the tension element 104 and the actuator AT104 to show, by way of example, the position and shape which these assume when the actuator A104 has been relieved of tension. In this case, the elastically deformed tension element 104 deforms from a curved state back into an approximately planar state. The tension element here is preferably formed from a plastic material and designed, in particular, in the form of a round rod or bar or in the form of a flat material or in the form of a profiled rod or bar. When the actuator AT104 has been relieved of tension, instead of a tensioned length b104, it has a longer, non-tensioned length B104. What has been said above in relation to the actuator AT104 and the tension element 104 also applies analogously to all other actuators. According to a variant which has not been illustrated, the tension elements are designed so as to be rigid and in a pre-shaped state. According to a further variant, the tension elements are designed so as to be rigid in certain regions and elastic in certain regions, wherein provision is made in particular for the tension elements to be designed so as to be elastic in their end regions.

In FIGS. 5*a* and 5*b*, the seat element S5 is shown from the rear, in the direction of a respective arrow Va, Vb, depicted in FIG. 5*c*, in an approximately orthogonal view of the underside 171*b* of the backrest surface 107. The carrying surface T5 is indicated in FIG. 5*a* only by transverse lines symbolizing the progression of the weft threads SF5. The carrying surface has been blanked out in FIG. 5*b*. Both illustrations, however, illustrate the pockets 108, 109, 158, 159, which are a constituent part of the carrying surface T5, and also use dashed lines to indicate the tension elements 104, 105, 154, 155, which are incorporated in the pockets 108, 109, 158, 159.

Figure 5E:
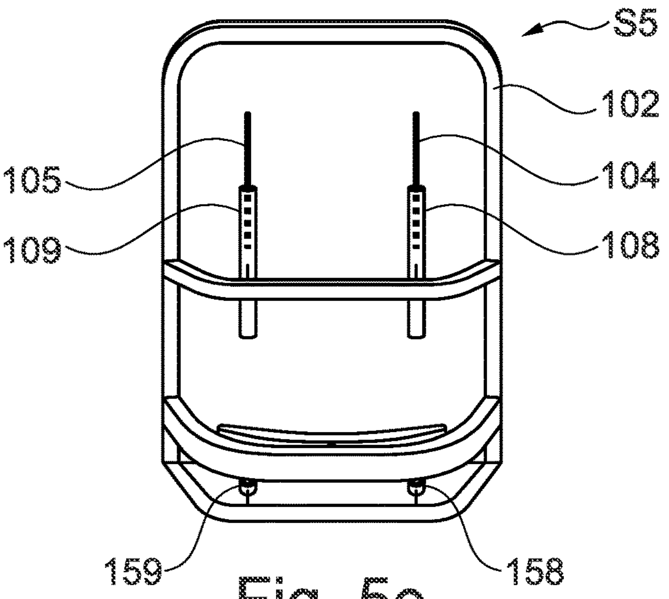

Looking at FIGS. 5*b* and 5*e* together, it can be seen that the tension elements 104, 105 are pushed into the pockets 108, 109 when the seat element S5 is being assembled. This also applies analogously to the pockets 158, 159.

The five tension elements 104, 105, 154, 155, 164 are pulled in the direction of one of the brackets B5-1, B5-2, B5-3, in each case by means of one of the actuators AT104, AT105, AT154, AT155, AT164, in such a manner that a level of tensioning to which the fabric 103*a*, 103*b* of the covering elements 145*a*, 145*b*, the fabric forming the seat surface 106 and the backrest surface 107, is subjected when the actuators AT104, AT105, AT154, AT155, AT164 have been activated is greater than a level of tensioning to which the fabric 103*a*, 103*b* of the covering element 145*a*, 145*b* is subjected when the actuator AT104, AT105, AT154, AT155, AT164 has been deactivated, and that the carrying surface T5 is deformed in the region of the tension elements 104, 105, 154, 155, 164. Correspondingly, when the actuators have been activated, the level of tensioning in the warp threads KF5 and/or in the weft threads SF5 is greater.

Figure 5F:
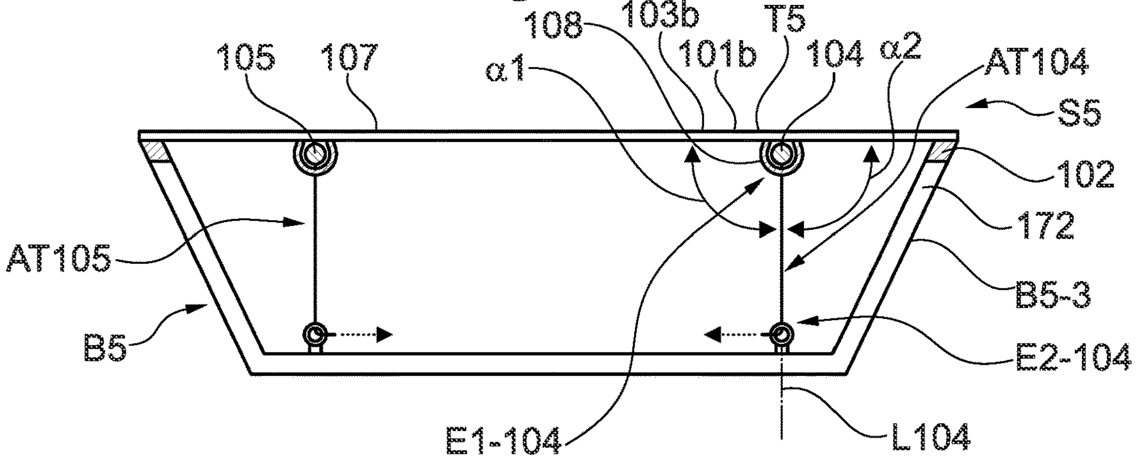
Figure 5G:
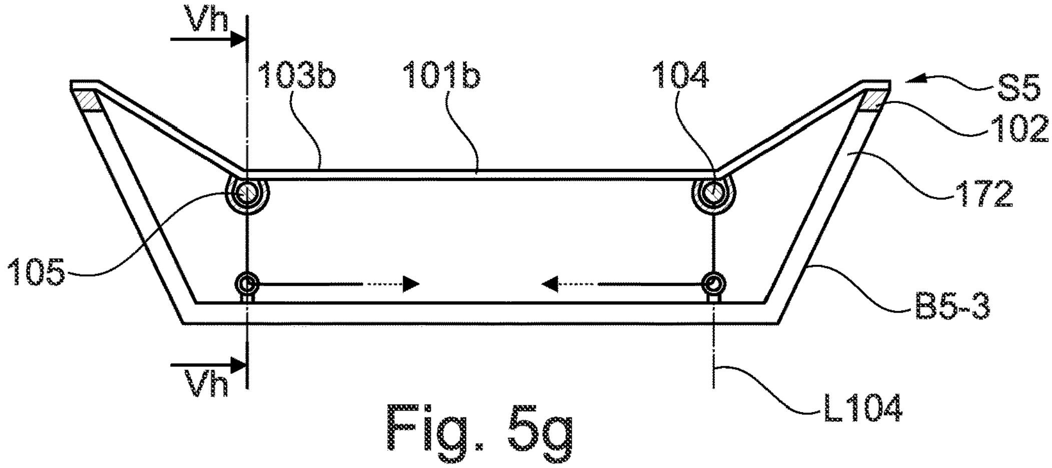

To provide a better explanation of the operation of the carrying surface T being tensioned by means of the tension elements and the actuators, FIG. 5*f* shows the "non-tensioned" state and FIG. 5*g* shows the "tensioned" state by way of simplified sections through the seat element S5 in the region of the upper bracket B5-3, wherein the progression of the section is indicated as section Vf in FIG. 5*c* and wherein the sections do not show any components of the seat element S5 that are located behind the section plane, so that in particular the seat surface has not been illustrated. Section Vf runs parallel to an upper side 172 of the upper bracket B5-3, so that the bracket B5-3 and the actuators AT104, AT105 can be seen in plan view and the carrier frame 102 and the carrier surface T5 are shown in section.

The actuator AT104 connects the tension element 104 and the bracket B5-3, which is a constituent part of the base B5. The tension element 104 is incorporated in the pocket 108 of the backrest surface 107 or of the carrying surface T. As soon as the actuator AT104 is activated, which in the exemplary embodiment illustrated takes place by virtue of the actuator AT104 being shortened, the tension element 104 is pulled in the direction of the bracket B5-3.

The tension element 104 of the supporting surface 101*b*, which forms the backrest surface 107, is connected to the base B5, in the form of the upper bracket B5-3, by the actuator AT104 in such a manner that, by way of its longitudinal axis L104, the actuator AT104 encloses an angle of at least 90° in all directions in space in relation to the supporting surface 101*b*, which is adjacent to the tension element 104, when the actuator AT104 has been deactivated. Two angles α1 and α2 are marked in FIG. 5*f* by way of example.

The tension elements 104, 105 are pulled in the rearward direction via the respective actuators AT104, AT105, so that predominantly the warp threads KT5 are tensioned between the tension elements 104, 105 and predominantly the weft threads SF5 is tensioned between the tension element 104 and a right-hand side member 132*a* and also between the tension element 105 and a left-hand side member 132*b* (see also figure c).

It is the case for all the exemplary embodiments that the longitudinal axis of the actuator is defined by a direction in which the actuator acts on the carrying surface.

The actuator 104 is connected by way of a first end E1-104 to the tension element 104 and by way of the second end E2-104 to the base B5, that is to say to the brackets B5-3 thereof. If the carrier frame is designed in such a manner that, when the actuator is in the desired orientation, the carrier frame is suitable for the fastening of the second end of the actuator, it is also possible to provide for corresponding fastening of the actuator on the carrier frame. The options described in this paragraph in respect of how actuators are arranged apply, in principle, to all the variants.

In FIGS. 5*f* and 5*g*, the actuator AT104 is symbolized as a pull cable which is shortened for activation purposes by being guided, at the bracket B5-5, through an eyelet and being subjected to pulling action at the pull cable. It is the case for all the exemplary embodiments that the individual actuators, corresponding to different variants, are designed in the form of mechanical actuators or in the form of electrical actuators or in the form of pneumatic actuators or in the form of hydraulic actuators or in the form of combinations of at least two of the aforementioned actuators. Provision is also made here, according to a variant, for one actuator to act on a plurality of tension elements. Correspondingly, in the case of the seat element being designed for a vehicle, provision can also be made for all the actuators, or a majority of the actuators, to be arranged beneath the seat surface. Furthermore, in the case of the seat element being designed for a vehicle, provision is also made for a chassis of the vehicle to form a constituent part of the base of the seat element and for at least some of the actuators to be fastened on the chassis, so that the chassis forms an abutment.

Figure 5H:
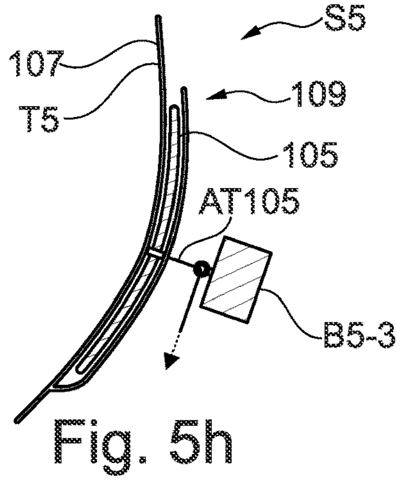

FIG. 5*h* shows a simplified illustration of a sectional view which can be taken from a section Vh-Vh depicted in FIG. 5*g*, wherein components of the seat element S5 that are located behind the section plane have been blanked out. It can be seen in this view how the tension element 105 has been curved by the—active—actuator AT105 acting centrally on said tension element and the actuator AT105 subjects the backrest surface 107 of the carrying surface T5 to shaping action by means of the tension element 105 incorporated in the pocket 109. The deformation of the tension element 105, and therefore of the backrest surface 107, is influenced here by how far the tension element 105 is pulled toward the upper bracket B5-3 by the actuator AT105.

If the seat element S5 is cut in section along a section plane which is parallel to a concealed side surface 173 (see FIG. 5*d*) of the lower bracket B5-1, this would result in sectional illustrations comparable to FIGS. 5*f* to 5*h*, so that what has been said above in relation to FIGS. 5*f* to 5*h* also applies analogously to the further tensioning and deformation increased tensioning and deformation of the seat surface 106 by means of the actuators AT154 and AT155.

Figure 5I:
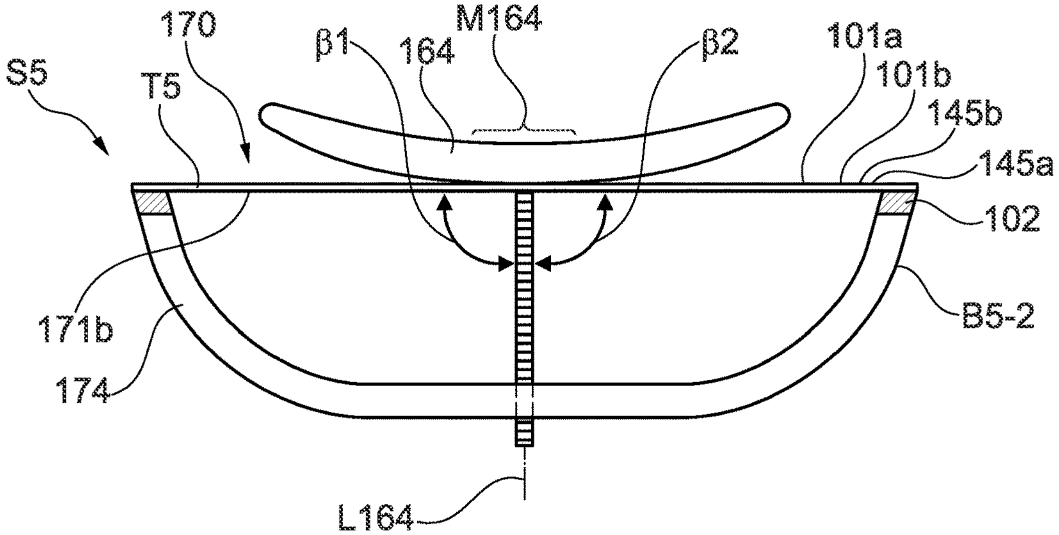
Figure 5J:
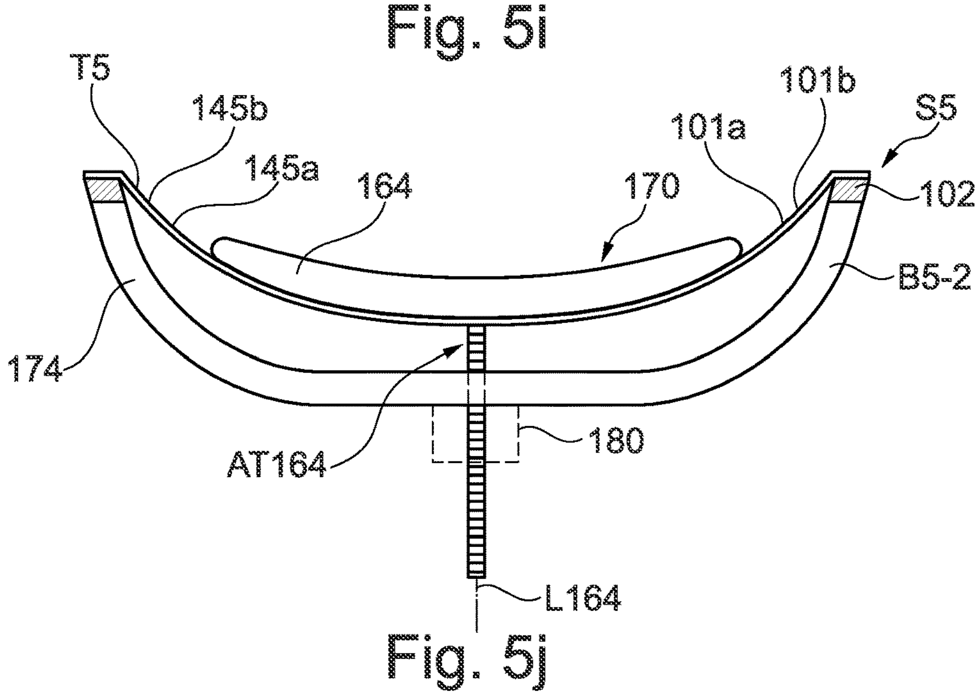

FIGS. 5*i* and 5*j* show, in a manner similar to FIGS. 5*f* and 5*g* and in likewise simplified form, sections which correspond to a section plane Vi, indicated in FIG. 5*d*, and are made in the region of the central bracket B5-2, parallel to a side surface 174 (see also FIG. 5*d*) of the central bracket B5-2. A comparison of FIGS. 5*i* and 5*j* shows how the tension element 164 is pulled toward the central bracket B5-2 by means of the actuator AT164 in order to shape the carrying surface T5 in its transition region 170. Here too, a longitudinal axis L164 of the actuator AT164 is oriented in relation to the carrying surface T5 in such a manner that, when the supporting surfaces 101*a*, 101*b* or covering elements 145*a*, 145*b* have been relieved of tension, it encloses at least an angle of 90° in all directions in space with the underside 171*b* of the carrying surface T5. The underside 171*b* here is also referred to as rear surface 171*b*. Angles β1 and β2 are marked in FIG. 5*i* by way of example. Instead of the supporting surfaces 101*a*, 101*b* being relieved of tension, it is also possible to refer to the carrying surface T5 being relieved of tension. For all the exemplary embodiments here, the carrying surface being in a state in which it has been relieved of tension or is not tensioned or is pretensioned is always understood to mean that state of the carrying surface which the latter assumes when there are no actuators acting on the tension elements connected to the same. Of course, in its state in which it has been relieved of tension, the carrying surface T5 always has a basic level of tensioning, which is imparted to the carrying surface by it being fastened on the carrier frame 102. In FIGS. 5*i* and 5*j*, the actuator AT164 is symbolized as a mechanical actuator which comprises a spindle 181 and a spindle drive 182 (illustrated only in FIG. 5*j*), wherein the spindle drive is designed in the form of an electric or mechanical drive.

Figure 6A:
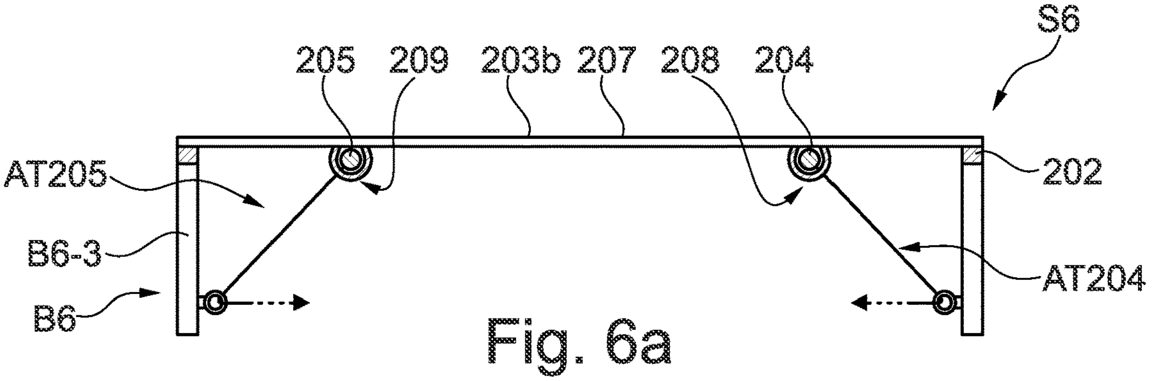
FIGS. 6*a* and 6*b* show detail-specific views of a sixth variant of a seat element.
Figure 6B:
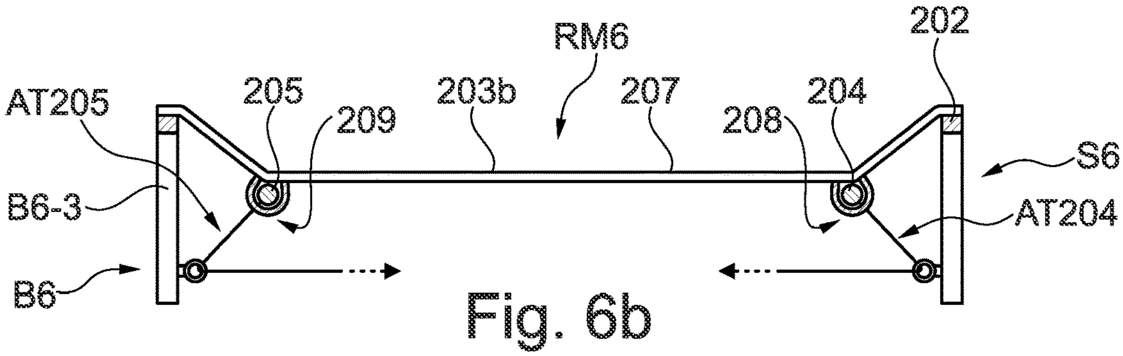

FIGS. 6*a* and 6*b* show, in illustrations analogous to FIGS. 5*f* and 5*g*, sections through a sixth variant of a seat element S6. The sixth seat element S6 comprises a backrest surface 207, which is supported by a carrier frame 202. The sixth seat element S6 also comprises a base B6, of which a rear bracket B6-3 is shown. A fabric 203*b*, which forms the backrest surface 207, comprises two pockets 208, 209, in which a respective tension element 204, 205 is incorporated. The seat element S6 also comprises a first actuator AT204, which connects the tension element 204 and the rear bracket B6-3, and a second actuator AT205, which connects the tension element 205 and the rear bracket B6-3. The tension elements 204, 205 are pulled away from one another, and obliquely outward in each case, via the respective actuators AT104, AT105, so that the fabric 203*b* is tensioned between the tension elements 204, 205 and is tensioned between the tension element 204 and a right-hand side member 232*a* and is deformed to give a backrest hollow RM6, as is shown in FIG. 6*b*.

Figure 7:
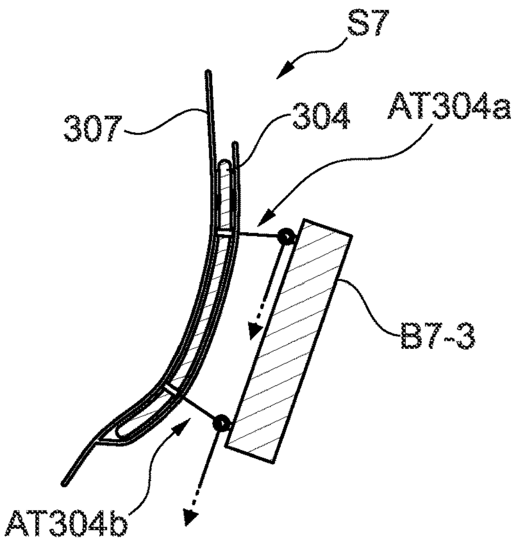
FIG. 7 shows a detail-specific view of a seventh variant of a seat element.

FIG. 7 shows, in an illustration analogous to FIG. 5*h*, a section through a seventh variant of a seat element S7. In contrast to the fifth variant, the seventh variant has two actuators AT304*a* and AT304*b* acting on the tension element 304, so that the latter is deformed with a comparatively low level of curvature and, in comparison with the fifth variant, a shallower backrest hollow RM7 is formed. In the case of the seventh variant, an upper bracket B7-3 is dimensioned so as to be greater than in the case of the fifth variant, so that the two actuators AT304*a* and AT304*b* can be oriented at desired angles in relation to a fabric 303*b* of a backrest surface 307 of the seat element S7.

Figure 8A:
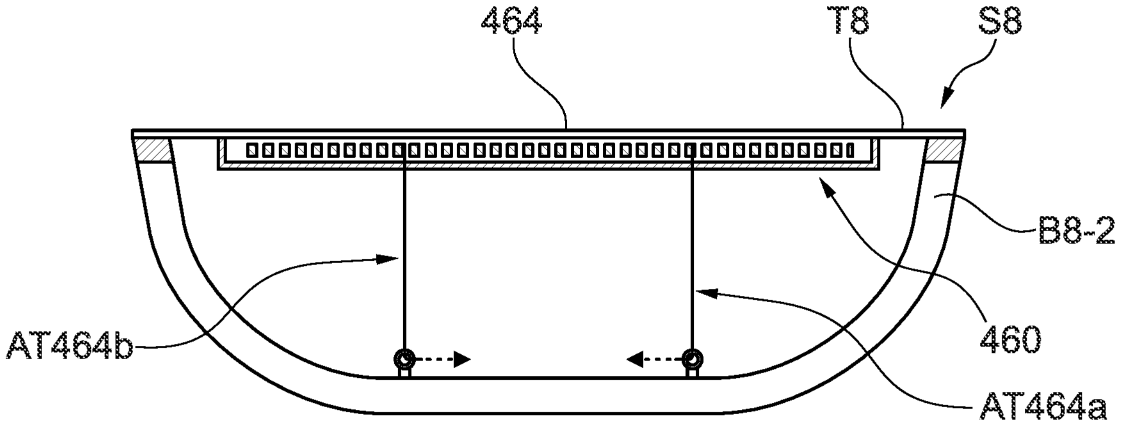
FIGS. 8*a* and 8*b* show detail-specific views of an eighth variant of a seat element.
Figure 8B:
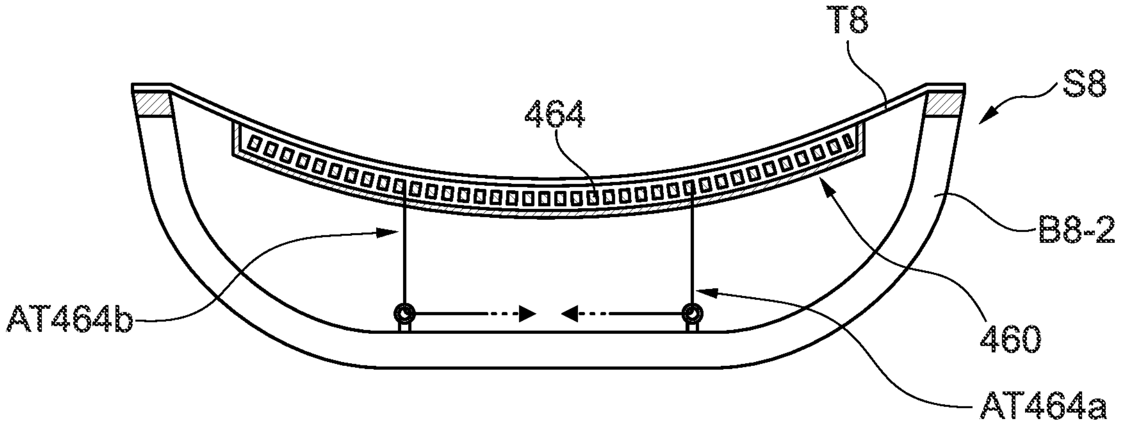

FIGS. 8*a* and 8*b* show, in illustrations analogous to FIGS. 5*i* and 5*j* of the fifth variant, sections through an eighth variant of a seat element S8. In contrast to the fifth variant, a tension element 464 is incorporated in a pocket 460 of a carrying surface T8 on an underside 471*b* of the carrying surface T8 and, instead of being pulled by just one actuator, is pulled by two actuators AT464*a* and AT464*b* in the direction of a central bracket B8-2 of the seat element S8.

It is the case for all the variants that each pocket forms a mount. Mounts here are understood to mean all structures which are suitable for fixing a tension element on the fabric, forming one of the supporting surface, in such a manner that the tension element can subject the fabric to pulling and shaping action.

Within the context of the present disclosure, increasing a level of tensioning to which the fabric is subjected is understood to mean that the tensioning of the fabric is increased at least in certain regions, wherein, to this end, there is an increase in the tensioning in the warp threads and/or in the weft threads of the fabric.

Although the present invention has been described with reference to preferred embodiments, workers skilled in the art will recognize that changes may be made in form and detail without departing from the spirit and scope of the invention.

LIST OF REFERENCE SIGNS

1*a*, 1*b* Supporting surface
2 Carrier frame
3*a*, 3*b* Fabric
4, 5 Tension element
6 Seat surface
7 Backrest surface
S1 Seat element single-part carrying surface
T1 Carrying surface
21*a*, 21*b* Supporting surface
22 Carrier frame
23*a*, 23*b* Fabric
24, 25 Tension element
26 Seat surface
27 Backrest surface
28, 29 Pockets
S2 Seat element
T2 Single-part carrying surface
32 Carrier frame
32*a* Right-hand side member
32*b* Left-hand side member
33*b* Fabric
34 Tension element
34*a*, 34*b* Linear portion of 34
35 Tension element
35*a*, 35*b* Linear portion of 35
36 Point of engagement on 34
37 Point of engagement on 35
38, 39 Pocket
a34 Point of engagement on 34
a35 Point of engagement on 35
37 Backrest surface
S3 Seat element single-part carrying surface
41 Seat surface
42 Backrest surface
43 Left-hand side member
44 Right-hand side member
45*a*, 45*b* Covering element
46 Fabric zone
47 Netting-like fabric zone
48, 49 Tension element
50, 51 Pocket
S4 Seat element
101*a*, 101*b* Supporting surface
102 Carrier frame
102*b* Left-hand side member
102*a* Right-hand side member
102*c* Upper crossmember
102*d* Front crossmember
103*a*, 103*b* Fabric
104, 105 Tension element
106 Seat surface
107 Backrest surface
108, 109 Pocket
145*a*, 145*b* Covering element
154, 155 Tension element
158, 159 Pocket

164 Fifth tension element
L164 Longitudinal axis of AT164
170 Transition region of T5
171*a* Upper side/front surface of T5
171*b* Underside/rear surface of T5
172 Upper side of the upper bracket B5-3
173 Side surface 173 of the lower bracket B5-1
174 Side surface 174 of the central bracket B5-2
181 Spindle
182 Spindle drive
α1, α2 Angle
β1, β2 Angle
AT104 Actuator
AT105 Actuator
AT154 Actuator
AT155 Actuator
AT164 Actuator AT164
b104 Length of AT104
B104 Length of AT104
B5 Base of S5
B5-1-B5-3 Bracket
E1-104, E2-104 First/second end of 104
KF5 Warp thread
L104 Longitudinal axis of AT104
M164 Central region of 164
RM5 Backrest hollow
Weft thread
SF5 Seat hollow
S5 Seat element
T5 Carrying surface
202 Carrier frame
203*b* Fabric
204, 205 Tension element
207 Backrest surface
208, 209 Pocket
232*a* Right-hand side member
232*b* Left-hand side member
AT204 First actuator
AT205 Second actuator
B6 Base of S6
B6-3 Rear bracket
RM6 Backrest hollow
S6 Seat element
304 Tension element
303*b* Fabric
307 Backrest surface
AT304*a*, AT304*b* First/second actuator
B7-3 Upper bracket
RM7 Backrest hollow
S7 Seat element
460 Pocket
464 Tension element
471*b* Underside of T8
AT464*a*, AT464*b* First/second actuator
B8-2 Central bracket
S8 Seat element
T8 Carrying surface

The invention claimed is:

1. A seat element comprising:

a carrier frame, one or more actuators, and supporting surfaces, wherein the carrier frame comprises at least one left-hand side member and a right-hand side member, wherein the supporting surfaces comprise a seat surface and/or a backrest surface, wherein at least one supporting surface of the supporting surfaces comprises a covering element, wherein the covering element comprises a fabric and is stretch-mounted on the at least one left-hand side member and on the right-hand side member of the carrier frame, wherein the covering element comprises tension elements, wherein each tension element of the tension elements is subjected to pulling action by at least one actuator of the one or more actuators such that a level of tensioning to which the fabric of the covering element is subjected when the at least one actuator has been activated is greater than a level of tensioning to which the fabric of the covering element is subjected when the at least one actuator has been deactivated, wherein at least one tension element of the tension elements is arranged on a front surface of the covering element and the at least one actuator acts on a rear surface of the covering element, the rear surface being located opposite the front surface, in order to subject the at least one tension element to the pulling action, wherein the at least one actuator and the at least one tension element are connected to one another through the covering element, and wherein the at least one tension element comprises at least one fastening point that engages through the covering element.

2. The seat element according to claim 1, wherein the fabric of the covering element comprises at least one weft thread and warp threads, wherein the at least one weft thread runs in a central region of the covering element in a direction transverse to the warp threads.

3. The seat element according to claim 1, wherein the fabric of the covering element includes a looped-stitch structure made of yarns, by loops of thread being interlaced, and wherein looped stitches, of the looped-stitch structure, are formed in a row one after another, in the form of knitted looped stitches.

4. The seat element according to claim 1, wherein, in a region of the fabric, the covering element comprises different fabric densities, including looped-stitch sizes or thread spacings.

5. The seat element according to claim 1, wherein the tension elements are connected to the covering element in such a manner that each of the tension elements is retained in a non-displaceable manner on the covering element.

6. The seat element according to claim 1, wherein the at least one tension element is incorporated in a mount formed on the front surface.

7. The seat element according to claim 1, wherein the at least one tension element is introduced within the covering element, and is incorporated in a structure of the covering element, and wherein the fastening point is configured to pass out of the covering element.

8. The seat element according to claim 1, wherein, at least one mount is formed by at least one pocket on the covering element, and wherein the at least one tension element is incorporated in the at least one mount or is fastened on the at least one mount.

9. The seat element according to claim 1, wherein the at least one actuator comprises a tensioning body, and wherein the covering element is connected to the tensioning body via the at least one tension element and a force-transmission element including a tensioning slide and/or deflecting element and/or hydraulic element and/or pneumatic element.

10. The seat element according to claim 1, wherein deformation of the at least one supporting surface takes place by the covering element being tensioned by virtue of the at least one tension element being subjected to a pulling force by the at least one actuator, the pulling force running in a direction of a plane defined by the covering element.

11. The seat element according to claim 1, wherein a plurality of zones are formed by one or more tension elements of the tension elements and/or a plurality of covering elements, and wherein the one or more tension elements are arranged in different ways on the plurality of covering elements.

12. The seat element according to claim 1, wherein:

the seat element comprises a base, the carrier frame is connected to the base, and a first end of one actuator of the one or more actuators is connected to one tension element of the tension elements such that a second end of the one actuator is connected to the base or the carrier frame.

13. The seat element according to claim 12, wherein the one tension element is connected to the base by the one actuator such that, by way of a longitudinal axis of the one actuator, the one actuator encloses an angle of at least 30° in relation to a particular supporting surface, which is adjacent to the one tension element.

14. The seat element according to claim 12, wherein at least one arcuate tension element is arranged in a transition region of the supporting surfaces, wherein the transition region of the supporting surfaces extends, in the form of a carrying surface, from the backrest surface into the seat surface, and wherein the arcuate tension element is connected to the base by at least one actuator of the one or more actuators such that the arcuate tension element is braced away in a rearward direction from a front edge of the seat surface and is braced away in a downward direction from an upper edge of the backrest surface.

15. The seat element according to claim 1, wherein a tensile force of the at least one actuator is adjusted either manually or by motor, and wherein a plurality of actuators of the one or more actuators are jointly adjustable.

16. The seat element according to claim 1, wherein the at least one tension element includes a rectilinear structure, curved structure, a Y-type structure, an annular structure, or a polygonal structure, and wherein the at least one tension element is elastically deformable, is rigid, or is partially rigid and partially elastic in end regions.

17. The seat element according to claim 1, wherein the at least one tension element is connected to the at least one actuator exclusively in a central region of the at least one tension element.

18. The seat element according to claim 1, wherein at least one of:

the carrier frame comprises at least one upper bracket, which connects the at least one left-hand side member and the right-hand side member behind the backrest surface and runs at a distance from the backrest surface, the carrier frame comprises at least one lower bracket, which connects the at least one left-hand side member and the right-hand side member beneath the seat surface and runs at a distance from the seat surface, or the carrier frame comprises a central bracket, which connects the at least one left-hand side member and the right-hand side member in a transition region of the supporting surfaces, the seat surface and the backrest surface merging into one another in the transition region, and the central bracket runs at a distance from the seat surface and at a distance from the backrest surface.

* * * * *